United States Patent [19]

French-St. George et al.

[11] Patent Number: 6,018,711
[45] Date of Patent: Jan. 25, 2000

[54] COMMUNICATION SYSTEM USER INTERFACE WITH ANIMATED REPRESENTATION OF TIME REMAINING FOR INPUT TO RECOGNIZER

[75] Inventors: Marilyn French-St. George, Alcove; Frederic Fernand Trasmundi, Ottawa; Jobe L.W. Roberts, Wakefield, all of Canada

[73] Assignee: Nortel Networks Corporation, Montreal, Canada

[21] Appl. No.: 09/063,007

[22] Filed: Apr. 21, 1998

[51] Int. Cl.$^7$ .................................................... G10L 5/00
[52] U.S. Cl. ........................... 704/275; 704/270; 455/231
[58] Field of Search ................................. 704/270, 275; 455/231

[56] References Cited

PUBLICATIONS

Jian Wang, "Integration of eye–gaze, voice and manual response in multimodal user interface," Proc. IEEE International Conference on Systems, Man, and Cybernetics, vol. 5, p. 3938–3942, Oct. 1995.

M. Billinghurst and J. Savage, "Adding intelligence to the interface," Proc. IEEE International Symposium on Virtual Reality, p. 168–175, Mar. 1996.

Rajeev Sharma, Vladimir I. Pavlovic, and Thomas S. Huang, "Toward multimodal human–computer interface,"Proc. IEEE, vol. 86, No. 5, p. 853–869, May 1998.

Ben Salem, Rob Yates, and Reza Saatchi, "Current trends in multimodal input recognition," IEE Colloquium on Virtual Reality Personal Mobile and Practical Applications (Ref. No. 1998/454), p. 3/1–3/6, Oct. 1998.

*Primary Examiner*—David R. Hudspeth
*Assistant Examiner*—Tālivaldis Ivars Šmits
*Attorney, Agent, or Firm*—Angela C. de Wilton

[57] ABSTRACT

A system and method for management of an interface for communications systems and devices using a recognizer having a limited time duration recognition window, based on mapping available time to a spatial representation. The system has particular application to management of a speech interface for a speech recognizer with a limited time duration recognition window. When the speech recognizer is on and a recognition window is opened, a timing signal is sent to the device and processed to provide spatial representation of the time remaining, e.g. in the form of an animation on a graphical user interface, or a recognizable pattern of stimulation using a haptic interface. As the recognition window advances and closes, the animation or pattern also changes and closes, e.g. diminishes in size, to provide the user with spatial information indicative of the time left in the recognition window. A reset feature allows users to reopen the recognition window to delete and correct input, while the window is still open, or after closing the window, and before the system advances to an erroneous state. The system is particularly applicable to speech recognizers having a limited recognition window that access speech recognition engines resident on a network or at a terminal device.

29 Claims, 4 Drawing Sheets

COMMUNICATION SYSTEM USER INTERFACE WITH ANIMATED REPRESENTATION OF TIME REMAINING FOR INPUT TO RECOGNIZER

RELATED APPLICATIONS

This application is related to U.S. patent application Ser. No. 09/062,969 entitled "Server for handling multimodal information" to H. Pasternak; and U.S. patent application Ser. No. 09/062,970 entitled 'Management of speech and audio prompts in multimodal interfaces' to M. French St. George, filed concurrently herewith.

FIELD OF THE INVENTION

This invention relates to management of interfaces for telecommunications systems and devices having a limited time window for capturing input, with particular application to speech recognizers having a limited time window for responding to a speech prompt.

BACKGROUND OF THE INVENTION

Telecommunications systems with a speech recognition capability have been in use for some time for performing basis tasks such as directory dialling. There are also network based speech recognition servers that deliver speech enabled directory dialling to any telephone. Typically, speech prompted interfaces have been used in telecommunications systems in contexts where there is no visual display or the user is unable to use visual displays, for example, a conventional telephone terminal.

Typically, the speech interface prompts the user when to speak by providing a speech prompt, i.e. a recognisable phrase or question prompting for user input, or by emitting a 'speak now' beep after which the speech recognizer is turned on, for a limited time window, typically a few seconds, during which the user may respond.

Users of telecommunications equipment employing speech recognition systems often report feeling rushed when prompted to respond immediately after a beep or other audible prompt.

Part of this rushed feeling may be attributed to a sense that the device will stop recognition before the user has completed their verbal request because the user receives no indication of the time window available to respond after the recognizer it turned on or when the recognition window is open. The user may find it difficult to know when the speech recognizer is on, may talk when the recognizer is off, or may become confused by no response.

Other difficulties may occur if the user does not remember what is acceptable input vocabulary or grammar to use. In addition to the sense of having to respond right now, current speech interface structures do not provide the user with an opportunity to rephrase a request, or change their mind before waiting for the system to respond. The user's utterance is accepted and interpreted, and the system advances to the next logical state, which may result in an error, for example if the user mis-speaks, coughs, or simply makes a mistake. Similarly, undue hesitation after a partial response may cause the system to move prematurely to the next logical state. If this state is not where the user wants to be, the user must navigate back to the previous state and restate the request.

Currently, the best recognizers in use have a 90 to 95 percent recognition performance under optimum conditions, and a noisy background environment, other speakers, user accents, the user speaking to softly, may adversely affect recognition performance.

When conditions are not optimum, additional dialogue may assist. For example, the recognizer may give repeat instructions, or provide additional instructions. Nevertheless, using speech to provide additional information is slow. Consequently the user may perceive an excessively long wait for the system to reset and issue a new prompt. Typically, speech is perceived as fast for input, and slow for output.

Many users report becoming frustrated with using interactive voice response (IVR) systems offering many choices or a multi level menu system of choices. The user may forget long lists of instructions, or become confused or lost in a complex speech application.

User difficulties in interacting with these systems represent some reasons such speech interfaces have not yet gained as widespread acceptance as they might.

Older systems which also provide a graphical user interface, i.e. a screen display, with a speech interface, have been discrete non-integrated techniques That is the system may use either a touch input or a speech input, but not both simultaneously.

To overcome the inconvenience of switching between discrete applications offering different modes of interaction, systems are being developed to handle more than one type of interface, i.e. more than one mode of input and output, simultaneously. In the following description the term input/output modality refers to a sensory modality relating to a user's behaviour in interacting with the system, i.e. by using auditory, tactile and visual senses. Input/output modes refer to specific examples of use of these modalities. For example speech and audio input/output represent an auditory modality; use of a keypad, pen, and touch sensitive buttons represent a tactile input modality, and viewing a graphical display relies on the visual modality.

An example of a multimodal interface is 08/992,630 entitled "Multimodal User Interface", filed Dec. 19, 1997, to Smith and Beaton, which is incorporated herein by reference. This application discloses a multi-modal user interface and provides a telecommunications system and methods to facilitate multiple modes of interfacing with users for example, using voice, hard keys, touch sensitive soft key input, and pen input. This system provides, e.g. for voice or key input of data, and for graphical and speech data output. The user may choose to use the most convenient mode of interaction with the system and the system responds to input from all modes.

Thus, interfaces for communications devices and computer systems are becoming increasingly able to accept input and provide output by various modes.

For example, current speech recognition interfaces may be used in association with an visual display showing an icon that indicates current word recognition state. These icons change visually when the recognition state changes from listening to not-listening. For example, a "talk now" icon may be displayed in the corner of the screen. While these icons indicate to the user that the speech recognizer is on, the icons do not overcome the users perception of urgency to talk before the window closes. Also, as mentioned above if an error is made, or speech input is interrupted by extraneous background noise, the system waits until the 'talk now' or recognition window closes, and advances to the next logical state to recover from such an error, before issuing a new prompt and reopening the recognition window.

There also exist natural language speech interfaces that are always on, which preclude the need for beeps that inform the user of when to start talking. The user may speak at any time, and the recognizer will always be ready to listen. Currently this type of recognition is not yet widely distributed and used. These more advanced speech recognizers currently rely on a network based speech recognizer to provide the necessary processing power. Thus in the foreseeable future, this type of advanced speech recognition will co-exist with simpler forms of recognition that require a limited duration 'time to talk' window, or recognition window.

SUMMARY OF THE INVENTION

Thus, the present invention seeks to provide a system and method for management of an interface for a communications systems or devices including a limited time duration window for accepting input, and particularly for management of a speech interface for a speech recognizer with a limited duration 'time-to-talk' window, which avoids or reduces some of the above mentioned problems.

Therefore, according to a first aspect of the present invention there is provided a communications system comprising:

an interface operable for receiving input during limited time recognition window, means for mapping available time of the recognition window to a spatial representation in animated form using one of a graphical modality, haptic modality or auditory modality.

For example the spatial representation comprises one of a two dimensional representation and three dimensional representation which diminishes in size as the available time diminishes, thereby providing a user with an indication of the available time to provide input.

Where the means for mapping comprises a graphical user interface, preferably the spatial representation comprises graphical information in the form of an animation, which diminishes in size as the available time diminishes. The rate of size change of the animation may be linear or non-linear, as required, to influence the users perception of the remaining time available.

Alternatively, the means for mapping comprises a haptic interface and the spatial representation comprises an animated pattern of haptic stimulation, e.g. produced by a wristband stimulator.

Alternatively, the means for mapping comprises an auditory interface the spatial representation comprises a time dependent auditory pattern.

These alternative modalities may be combined, for example to provide both graphical and haptic feedback to the user regarding available time in the recognition window.

Preferably, the system also provide a means for resetting the recognition window by the user, and reinitiating the animation. For example, the reset means may be a key or button associated with the animation. Alternatively, a touch sensitive region may be associated with the animation, e.g a touch sensitive button associated with the animation.

According to another aspect of the invention there is provided a communications device comprising:

an speech interface for accessing a speech recognizer operable for receiving speech input during limited time recognition window, and means for mapping available time of the recognition window to a spatial representation in animated form using one of a graphical modality, haptic modality or auditory modality.

According to yet another aspect of the invention there is provided a communications system comprising:

a speech interface for accessing a speech recognizer operable for receiving speech input during limited time recognition window, means for mapping available time of the recognition window to a spatial representation in animated form using one of a graphical modality, haptic modality or auditory modality.

Thus where the interface is a speech interface and the animation is an animation displayed on the graphical interface, the animation itself may provide the touch sensitive region which shrinks as the recognition window closes, and which is operable by the user to reset the 'time to talk' recognition window. An appropriate graphical animation for a speech interface is a speech balloon.

Preferably, the system comprises means for resetting the recognition window, which comprises a tactile input means associated with the animation displayed on the graphical user interface, e.g. a button.

For example when the animation is provided by a touch sensitive region of the graphical user interface, the means for resetting the recognition window comprises an associated touch sensitive region of the graphical user interface.

Where speech input has already been captured, the reset means also functions to delete speech input when the speech recognition window is reset.

According to another aspect of the present invention there is provided a method of providing user feedback and control for a communications device for accessing a recognizer for receiving input while the recognizer is operable during a limited time duration recognition, comprising the steps of:

after prompting the user for input;

turning on the recognizer for a limited time duration recognition window;

and while the recognizer is on, mapping available time to a spatial representation in animated form in one of a graphical modality, haptic modality and auditory modality.

Where the interface comprises a graphical user interface the method comprises providing a spatial representation in the form of an graphical animation indicative of the time remaining in the recognition window, and preferably comprises displaying an animation which diminishes in size as the time remaining in the recognition window decreases.

This method is particularly useful for communications device having a speech interface for accessing a speech recognizer, where the speech recognizer is operable for receiving input during a limited time duration recognition window.

Beneficially while the speech recognizer is on, the method comprises generating a timing signal representative of the time remaining in the recognition window, controlling the animation using the timing signal and at each time increment of the timing signal capturing speech input, and checking for user input to a reset means, and when user input to the reset means is captured, resetting the recognition window, deleting captured speech input, and reinitiating the timing signal and the animation, and when the timing signal corresponds to the end of the recognition window, capturing aggregated speech input and closing the recognition window.

Another aspect of the present invention provides software on a computer readable medium for carrying out these methods.

Conveniently, in use of a speech interface, the graphical information is an animation displayed on the graphical user interface which changes as the recognition window closes with time. For example the animation may be a speech balloon, or other appropriate icon, which diminishes in size as the recognition window closes. The animation provides the user with a graphical representation of the time remaining to talk. Movement on the screen also has the advantage of drawing the users attention to the closing recognition window.

Thus the user receives a visual indication of the time remaining in the recognition window of the speech recognizer, and is provided with the option to reset the recognition window, for example, to correct a speech input error. Thus the user receives feedback regarding the operation of the speech recognizer, and is provided with an opportunity to control opening of the recognition window, e.g. to correct errors.

Beneficially, by using a multitasking, multimodal user interface, and combining a touch sensitive display to the interface, an animated graphic can also serve as a reset button that the user may touch, to re-open a closing window.

This user behaviour resets the recognition window and allows the user to correct or alter a spoken command to a speech interface without having to wait for the system to achieve its next state before returning to correct an input. Reset means allows the user reset the time window at will. If not reset the animation stops when the time reaches the time duration Tw and the recognition window closes, after capturing aggregated speech input collected while the window is open.

Provision of an animated graphical output, with or without haptic and auditory feedback, indicative of time available, provides the user with additional timing information. Consequently user feedback and control of the interface or speech interface is improved.

BRIEF DESCRIPTION OF THE DRAWINGS

The invention will now be described in greater detail with reference to the attached drawings wherein.

DETAILED DESCRIPTION OF THE INVENTION

Figure 1:
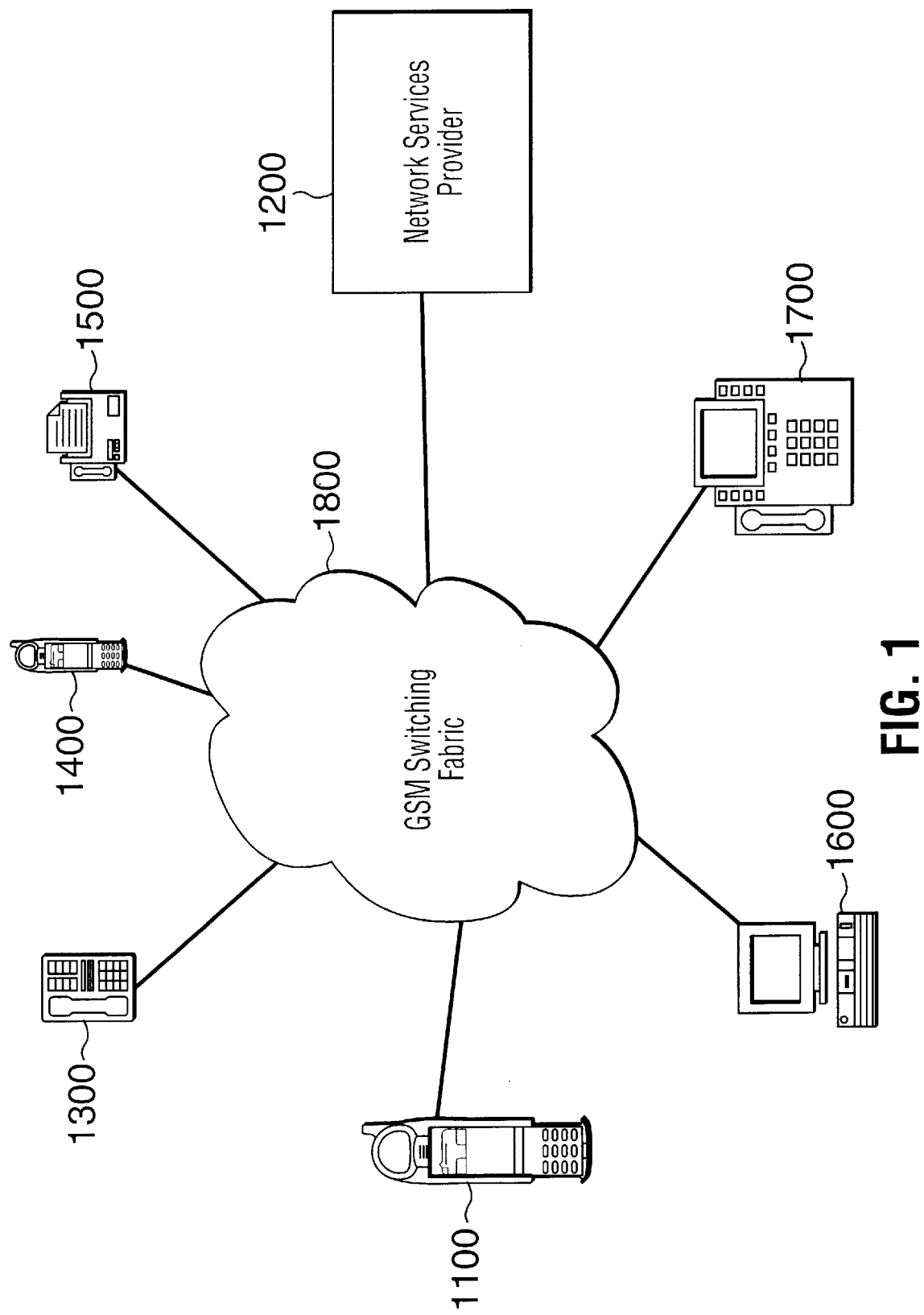
FIG. 1 shows a schematic block diagram of a communications network comprising a mobile telephone having a multitasking graphical user interface consistent with an embodiment of the present invention.

A schematic block diagram of a communications network 10 is shown in FIG. 1 and represents a GSM switching services fabric 20 and a network services provider 40 associated with a plurality of communications terminals, for example a mobile telephone 100, and other wired or wireless communications devices and terminals represented schematically by units 110, 120, 130, 140 and 150.

Figure 2:
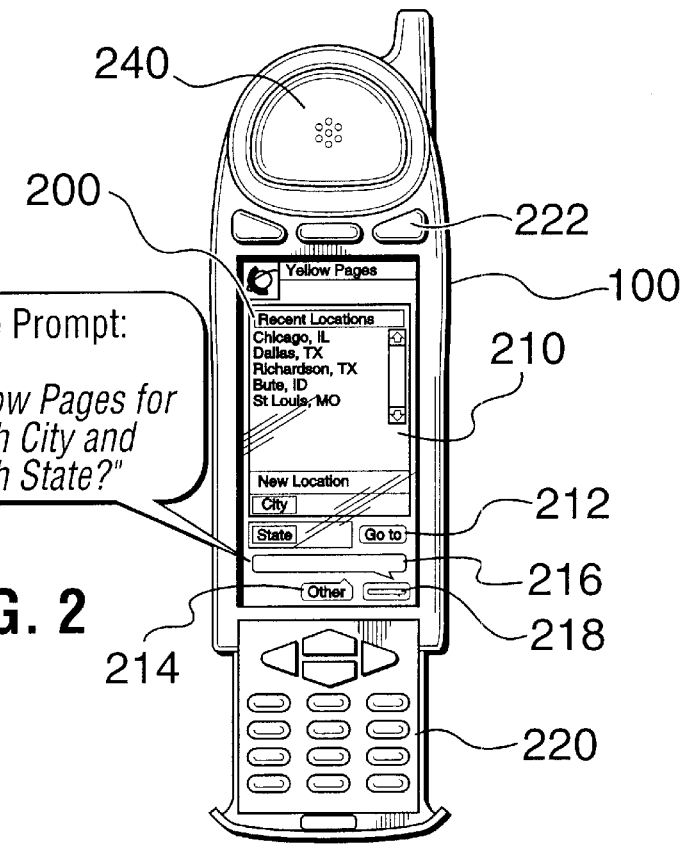
FIG. 2 shows schematically a diagram of mobile telephone of a first embodiment for operation in the network of FIG. 1.

The wireless mobile phone 100 according to a first embodiment of the present invention is shown enlarged in FIG. 2, and is provided with a multitasking graphical user interface, similar to that described in copending U.S. application Ser. No. entitled "Multimodal User Interface" filed Dec. 19, 1997, 08/992,630 to Smith and Beaton, which is incorporated herein by reference. This is a multi-modal user interface which provides a telecommunications system and methods to facilitate multiple modes of interfacing with users for example, using voice, hard keys, touch sensitive soft key input, and pen input. This system provides, e.g. for voice or key input of data, and for graphical and speech data output. Thus the user may choose to use the most convenient mode of interaction with the system and the system responds to input from all modes.

As shown in FIG. 2, mobile telephone unit 100 comprises a body 200 which carries a display screen 210 for the graphical user interface, which may include touch sensitive buttons 212; a conventional keypad 220 and other hard keys 222; speaker 240 associated with the speech interface to providing speech prompts as shown schematically by 230 to illustrate the various modes of interaction which may be selected by a user. Thus the system provides for conventional key input, a graphical user interface which includes touch sensitive soft keys, and a speech interface for outputting speech and audio prompts, and a speech recognizer to accept and interpret speech input. Optionally, the graphical user interface may support pen input to allow written input on a touch sensitive area of the screen.

The device 100 according to the first embodiment of the present invention comprises means for mapping available time of the recognition window to a spatial representation in one of a graphical, haptic or auditory modality. This embodiment is an example using a graphical modality for providing user feedback and control of a 'time to talk' recognition window of the speech interface. In FIG. 2, and in the enlarged schematic of the screen display shown in FIG. 3, near the bottom of the display screen 210, the user feedback means is an indicator which takes the form of an appropriate animated icon, or animation 216, as will be described below, and is associated with a touch sensitive button 218. The button 218 functions to control and reset the speech recognizer. The lower part of the screen 210 is shown enlarged in FIGS. 4A, 4B, 4C and 4D to show how the animation changes, i.e. shrinks, as the time to talk window of the speech recognizer is opened and closes.

Since speech and word recognition systems have limited recognition windows, when the speech recognizer is turned on and a recognition window is opened, a timing signal is sent to the device that starts the indicator, for example displaying the animation shown on a graphical display represented in FIGS. 4A to 4D. The signal contains information regarding the timing of the animation, and as the recognition window advances and closes, the animation also changes and closes. In this example the animation is a speech balloon which diminishes in size as the time to talk window closes. The timing signal contains information regarding the timing of the animation. As the recognition window closes, the animation also closes.

The rate at which the animation diminishes in size is controlled by the timing signal. The rate of change of the animation may be linear or non-linear with respect to the time available. While the user does not receive a count down, i.e. it is not a numeric display of the time remaining, the animation provides a spatial representation of the time remaining, which allows the user to gauge how much time is left. The user receives sufficient visual feedback on timing information to provide and indication of the progress of the window, and warning when the recognition window will close. The rate of change of the animation may be used to influence the users perception of the available time and the rate at which the window is closing.

In the example shown in FIGS. 2, 3 and 4A to 4D, the animation is a graphical speech balloon. Touching the button 218 associated with the animation, i.e. on an touch sensitive adjacent region of the screen display, sends a signal to the recognizer to delete any verbal signal associated with a previously opened recognition window in this state, and resets the timing signal, and the animation, indicating that the user may restate their request.

Thus, the user is provided with information regarding the time left in the recognition window, and an undo or reset feature is also provided. The reset feature allows users to correct speech utterances while the window is still open, or after closing the window, and before the system advances to an erroneous state.

Thus the speech interface is provided with animated graphical support, to indicate the time duration of an available recognition window.

Optionally, haptic support is provided in addition to graphical output, for example by providing a spatial representation of the time remaining through a haptic pattern generated by an array of stimulators carried on an associated wristband of the communications device.

Figure 5:
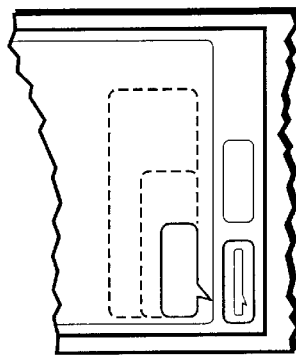
FIG. 5 shows schematically part of a graphical user interface representing an second embodiment of the indicator and controller.

While in this first embodiment, the balloon animation and balloon button are separate entities, advantageously, according to a second embodiment, the animation is provided on a touch sensitive area of the display, i.e. the animation itself is touch sensitive and functions as a soft button providing the reset function, as shown schematically in FIG. 5.

Figure 6:
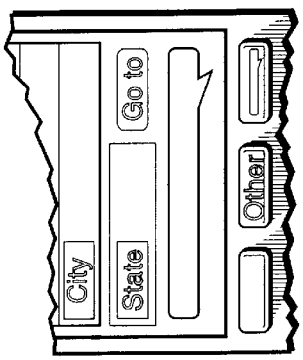
FIG. 6 shows schematically part of a graphical user interface representing an third embodiment of the indicator and controller.
Figure 7:
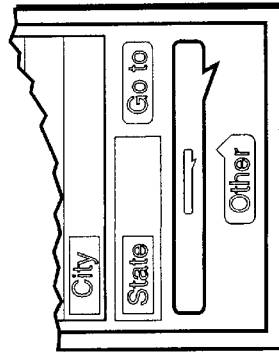
FIG. 7 shows schematically part of a graphical user interface representing an fourth embodiment of the indicator and controller.

Alternatively a soft key implementation of the indicator, i.e. the latter balloon button could alternatively is by a hard key button version, as shown schematically in FIG. 6. The animation illustrated above shrinks in length as the available time diminishes, but the animation may alternatively take any convenient form, and inanother embodiment shown in FIG. 7, the animation shrinks in 2 dimensions. These are simply given as examples, and any convenient form of animation may be used.

The user is provided with graphical and dynamic information regarding the time left in the recognition window.

The reset, or undo feature allows users to correct speech utterances before the system advances to an erroneous state.

Speech recognition may reside on the network, or at the terminal device, and the indicator and controller is applicable to speech and word recognition systems having limited recognition windows.

Figure 3:
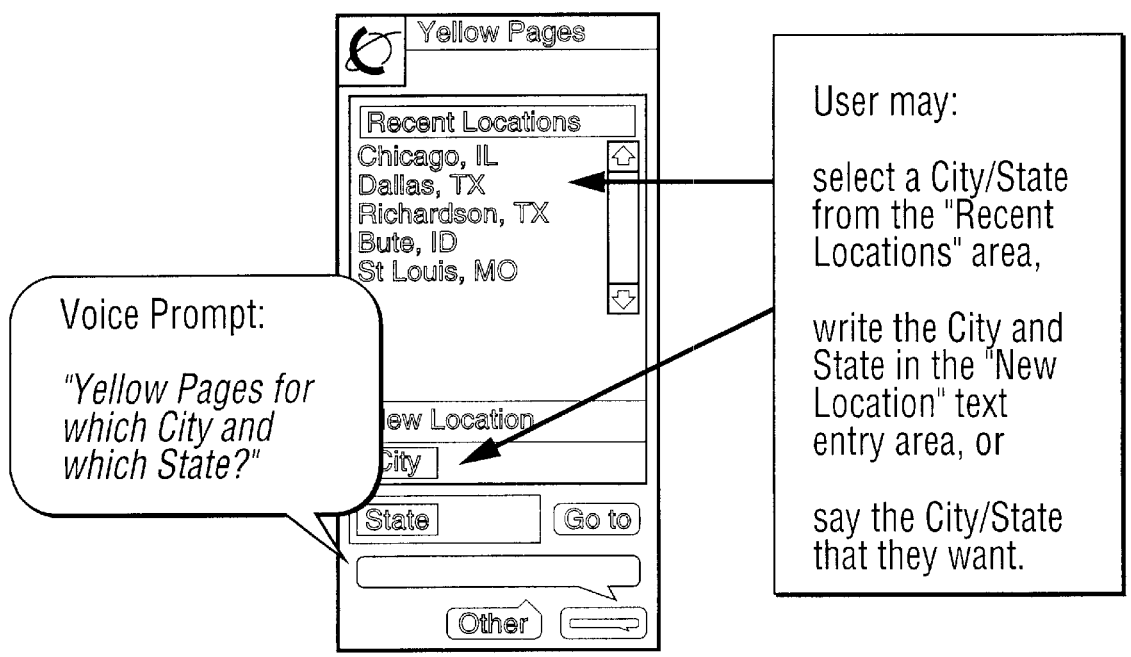
FIG. 3 shows part of the mobile telephone of FIG. 2 showing on an enlarged scale detail of the touch sensitive graphical display with pen input capability, during operation of a Yellow Pages directory application using a method according to an embodiment of the invention.
Figure 8:
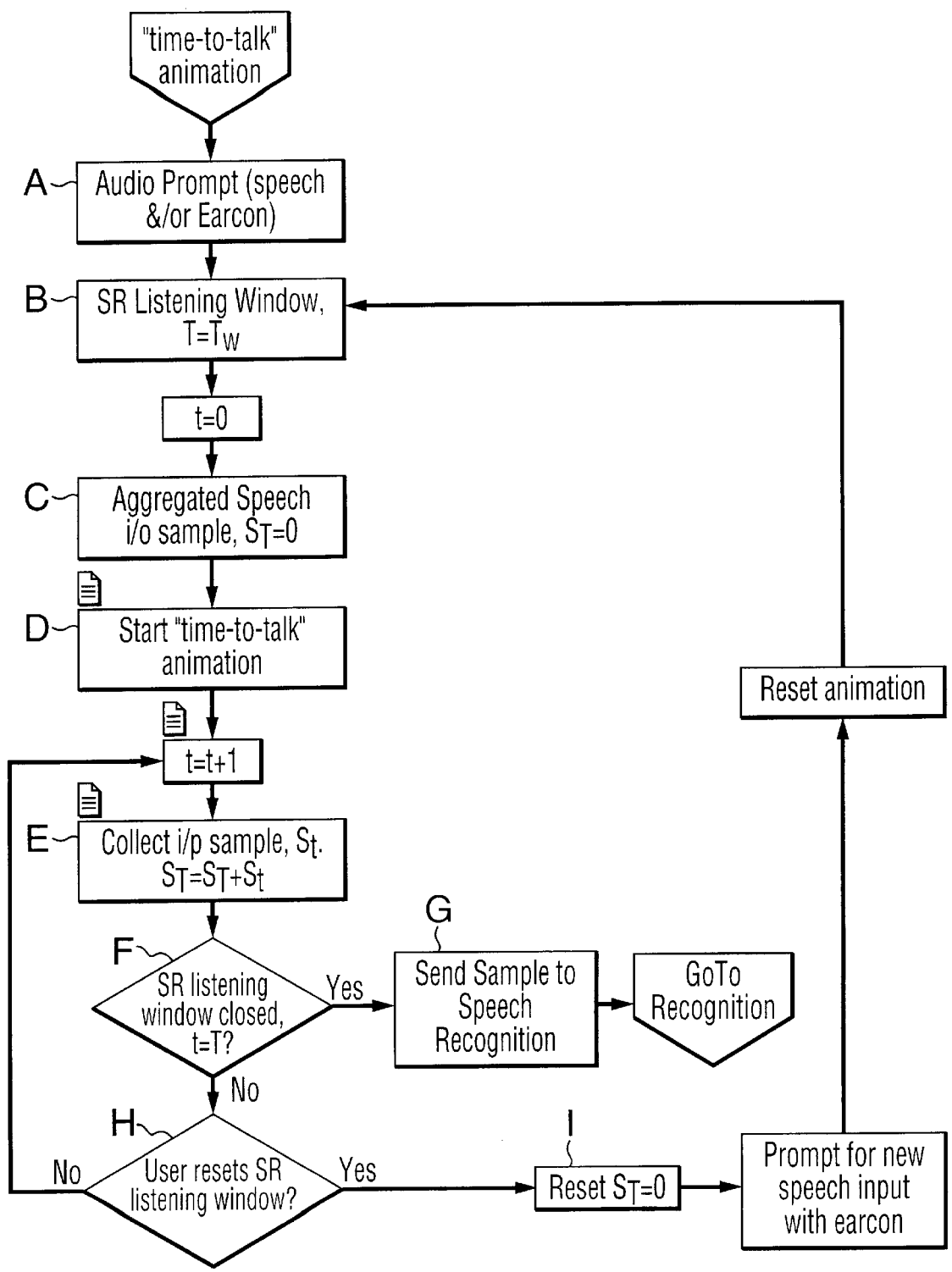
FIG. 8 shows a flow chart setting out the steps of a method of providing interface management according to an embodiment of the present invention, i.e. user feedback and control of a speech interface using a multimodal interface of the mobile telephone shown in FIGS. 2 and 3.

A method in accordance with the first embodiment of the present invention, with reference to the portable wireless terminal 100 shown in FIGS. 2 to 4, will be described in more detail with reference to the flow chart shown in FIG. 8.

In operation of the device, the use may pick up the device, and cause activation of the device either automatically upon picking up the device, or for example by pressing a button.

The speech recognizer is thereby switched on, and prompts the user for input (A). The prompt may be an audio, either by speech or an 'earcon', that is a recognizable sound such as a characteristic 'beep'. The speech recognizer (SR) window is turned on (B) for a specific recognition window $T=T_w$, and a timing signal is initiated at T=O, which is indicative of the time remaining, Tw, in the recognition window.

Figure 4A:
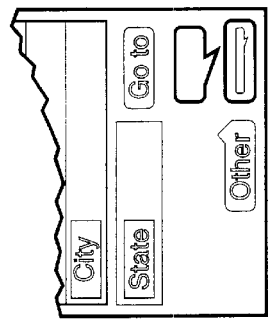
FIGS. 4A, 4B, 4C, and 4D show schematically part of the display shown in FIG. 3, showing on an enlarged scale, to show the time to talk indicator and controller displayed by the graphical interface as the time window of the speech recognizer advances.
Figure 4B:
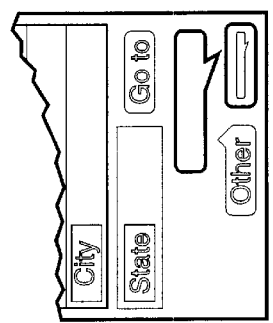
Figure 4C:
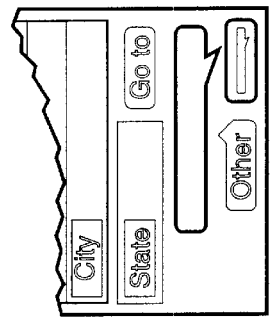
Figure 4D:
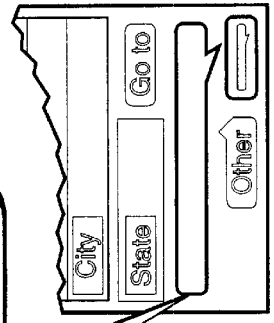

At time T=O, an aggregated speech input sample $S_T=O$ is captured (C) and a time-to-talk animation associated with the timing signal is displayed on the screen and the animation is started (D). The speech balloon is representing the speech recognition window, or 'time to talk' window, is displayed at its maximum size as shown in FIG. 4A.

At each specified time interval or time increment, t, an aggregated speech input sample is collected $S_T=S_O+S_t$. After each speech input is sampled, a check is made to determine if the speech recognizer window is open, i.e. if $T \leq Tw$.

When the time value is checked, if the speech recognizer recognition window has closed at T=Tw the aggregated speech sample is sent for speech recognition (G).

If the time window is still open T<Tw, the recognizer checks whether the user has issued a reset command, i.e. pressed the reset button, to reset the recognition window (H). If not, the timing signal advances, the collection of the next input speech sample is commenced (E). The animation continues to advance, diminishing in size continuously as the timing signal advances (see FIGS. 4B to 4D), to provide the user with a further visual indication of the diminishing available time to talk left in the recognition window.

When T=Tw, the aggregated speech sample is captured, the recognition is closed, i.e. the recognizer is turned off, and the animation ceases.

If at any time during the recognition window, the user resets the speech recognizer, any aggregated speech input that has been captured is erased, and a prompt for new speech input is issued, e.g. using a simple 'earcon'. The timing signal is reset, (I) and the animation is reset to the time zero display as shown in FIG. 4A.

The method of operation of the indicator and controller is generally applicable to all devices that access speech recognition engines, whether these are implemented locally, or on a network server.

The system and method described above was developed particularly to facilitate interaction with a speech recognizer. The system and method in general is not limited to speech interfaces, but may also be applied to other interfaces operating with a limited time window for receiving input. Another example may be a system for receiving and recognizing security information e.g. user id and password information, to provide access to an information system, wherein a time limit for access is provided, for example to deter unauthorized entry.

In another example (not shown) the haptic animation mentioned above may be provided instead of graphical information regarding the available time in the recognition window. In another example (not shown), the animation is auditory, i.e. a pattern of sound representative of the available time may be generated by stereo speakers of the communications device.

While the systems and methods described above may be implemented by any convenient software and hardware configuration for local device or network server implementation of a speech interface, and the method is intended to be platform independent. For Internet compatible communications devices, the current application is a preferred implementation of the current application uses a Java web server, such as one designed for this application as described in the above referenced copending U.S. patent application Ser. No. 09/062,969, entitled "Server for handling multimodal information" to H. Pasternak filed concurrently herewith, and incorporated herein by reference. This server was developed for handling information in different modal forms associated with respective input/output modalities of a multimodal interface, and may be used to implement the systems and methods described herein.

Although specific embodiments of the invention have been described in detail, it will be apparent to one skilled in the art that variations and modifications to the embodiments may be made within the scope of the following claims.

What is claimed is:

1. A communications system comprising:
   an interface operable for receiving input during limited time recognition window,
   means for mapping available time of the recognition window to a spatial representation in animated form using one of a graphical modality, haptic modality or auditory modality.

2. A system according to claim 1 wherein the spatial representation comprises one of a two dimensional representation and three dimensional representation which diminishes in size as the available time diminishes.

3. A system according to claim 1 wherein the means for mapping comprises a graphical user interface and the spatial representation comprises graphical information in the form of an animation.

4. A system according to claim 3 wherein the animation diminishes in size as the available time diminishes.

5. A system according to claim 4 wherein the rate of change of the animation is linear.

6. A system according to claim 4 wherein the rate of change of animation is non-linear.

7. A system according to claim 1 wherein the means for mapping comprises a haptic interface and the spatial representation comprises an animated pattern of haptic stimulation.

8. A system according to claim 1 wherein the means for mapping comprises an auditory interface the spatial representation comprises an time dependent auditory pattern.

9. A system according to claim 1 comprising reset means for resetting the recognition window and reinitiating the animation.

10. A communications device comprising:
    an speech interface for accessing a speech recognizer operable for receiving speech input during limited time recognition window, and
    means for mapping available time of the recognition window to a spatial representation in animated form using one of a graphical modality, haptic modality or auditory modality.

11. A communications system comprising:
    a speech interface for accessing a speech recognizer operable for receiving speech input during limited time recognition window,
    means for mapping available time of the recognition window to a spatial representation in animated form using one of a graphical modality, haptic modality or auditory modality.

12. A system according to claim 11 wherein the means for mapping comprises a graphical user interface and the spatial representation comprises a graphical animation.

13. A communications system according to claim 12 comprising means for resetting the recognition window.

14. A communications system according to claim 13 wherein the means for resetting the recognition window comprises a tactile input means associated with the animation displayed on the graphical user interface.

15. A communications system according to claim 13 wherein the animation is provided by a touch sensitive region of the graphical user interface, and the means for resetting the recognition window comprises an associated touch sensitive region of the graphical user interface.

16. A system according to claim 11 wherein the spatial representation comprises one of a two dimensional representation and three dimensional representation which diminishes in size as the available time diminishes.

17. A system according to claim 11 wherein the means for mapping comprises a haptic interface and the spatial representation comprises an animated pattern of haptic stimulation.

18. A system according to claim 11 wherein the animation diminishes in size as the available time diminishes.

19. A system according to claim 18 wherein the rate of change in size of the animation is linear.

20. A system according to claim 18 wherein the rate of change in size of animation is non-linear.

21. A system according to claim 11 wherein the animation is indicative of the operation of the recognition window, and the animation changes during the operation of the recognition window to indicate the remaining time duration of the recognition window.

22. A method of providing user feedback and control for a communications device for accessing a recognizer for receiving input while the recognizer is operable during a limited time duration recognition, comprising the steps of:
    after prompting the user for input;
    turning on the recognizer for a limited time duration recognition window;
    and while the speech recognizer is on, mapping available time to a spatial representation in animated form in one of a graphical modality, haptic modality and auditory modality.

23. A method according to claim 22 wherein the interface comprises a graphical user interface and the method comprises providing a spatial representation in the form of an graphical animation indicative of the time remaining in the recognition window.

24. A method according to claim 23 comprising displaying an animation which diminishes in size as the time remaining in the recognition window decreases.

25. A method of providing user feedback and control for a communications device having a speech interface for accessing a speech recognizer, the speech recognizer being operable for receiving input during a limited time duration recognition window, comprising the steps of:
    after prompting the user for input;
    turning on the recognizer for a limited time duration recognition window;
    and while the speech recognizer is on, mapping available time to a spatial representation in animated form using one of a graphical modality, haptic modality and auditory modality.

26. A method according to claim 25 wherein the interface comprises a graphical user interface and the method comprises providing a spatial representation in the form of an graphical animation indicative of the time remaining in the recognition window.

27. A method according to claim 26 comprising displaying an animation which diminishes in size as the time remaining in the recognition window decreases.

28. A method according to claim 27 comprising, while the speech recognizer is on, generating a timing signal representative of the time remaining in the recognition window, controlling the animation using the timing signal and at each time increment of the timing signal capturing speech input, and checking for user input to a reset means, and when user input to the reset means is captured, resetting the recognition window, deleting captured speech input, and reinitiating the timing signal and the animation, and when the timing signal corresponds to the end of the recognition window, capturing aggregated speech input and closing the recognition window.

29. Software on a computer readable medium for carrying out a method of providing user feedback and control for a communications device having a speech interface for accessing a speech recognizer, the speech recognizer being operable for receiving input during a limited time duration recognition window, comprising the steps of:

after prompting the user for input;

turning on the recognizer for a limited time duration recognition window;

and while the speech recognizer is on, mapping available time to a spatial representation in animated form using one of a graphical modality, haptic modality and auditory modality.

* * * * *